Sept. 5, 1967   J. K. LAMP, JR., ET AL   3,339,474
APPARATUS FOR TRANSPORTING PLANT AND ANIMAL MATERIALS
Filed Jan. 14, 1966   2 Sheets-Sheet 1
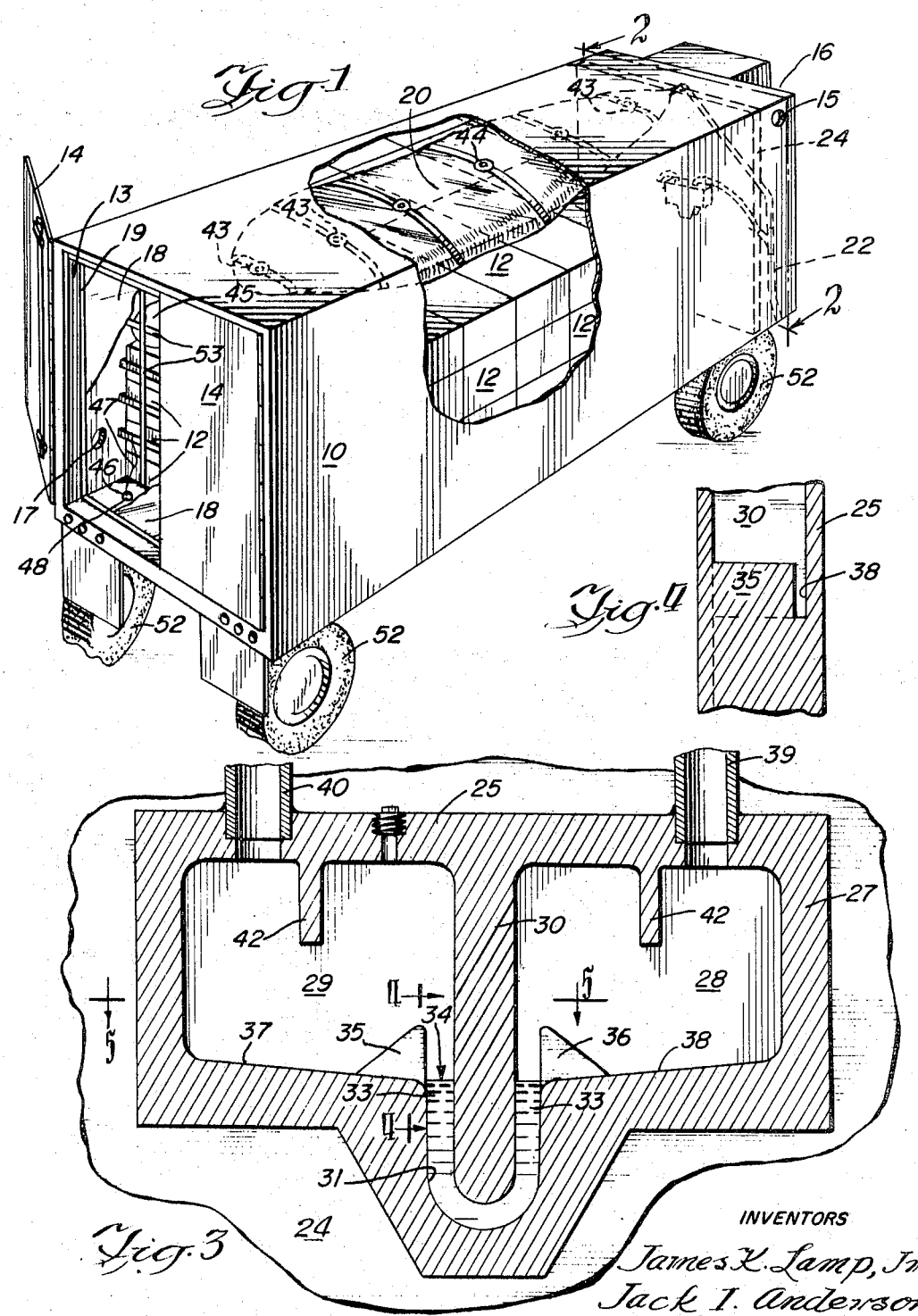
INVENTORS
James K. Lamp, Jr.
Jack I. Anderson
Richard G. Hagenauer
BY Hofgren, Wegner, Allen, Stellman & McCord
ATTORNEYS

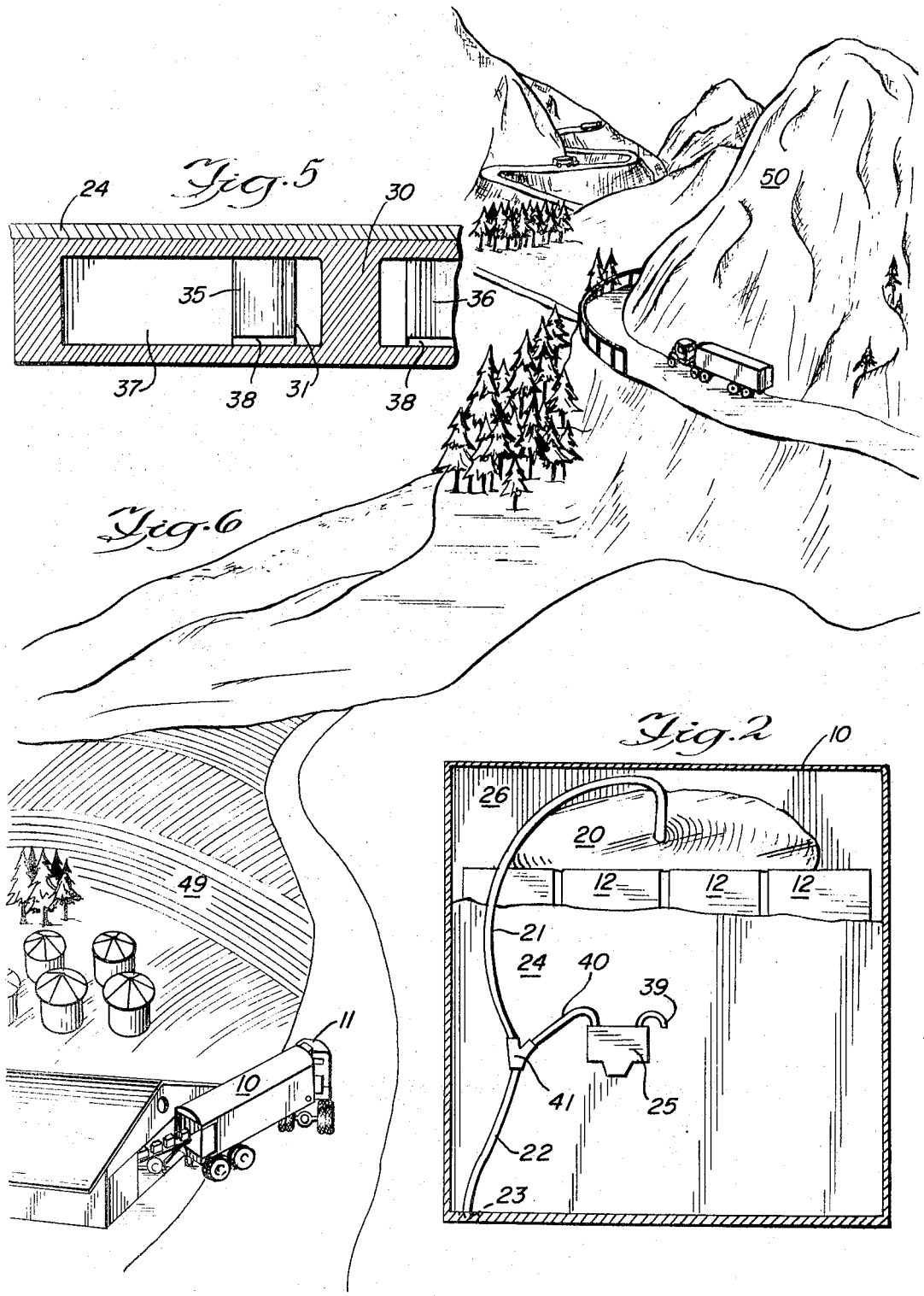

United States Patent Office 3,339,474
Patented Sept. 5, 1967

3,339,474
APPARATUS FOR TRANSPORTING PLANT AND ANIMAL MATERIALS
James K. Lamp, Jr., San Jose, and Jack I. Anderson, Downey, Calif., and Richard G. Hagenauer, Hatboro, Pa., assignors to Whirlpool Corporation, a corporation of Delaware
Filed Jan. 14, 1966, Ser. No. 520,735
5 Claims. (Cl. 99—271)

ABSTRACT OF THE DISCLOSURE

The placement of a plastic bag in a semi-trailer or movable container and connecting the bag to ambient atmosphere to compensate for a differential in pressure between the inside and outside of the trailer. Also, an ultimate pressure relief valve to serve as a safety pressure release under severe pressure differential conditions. The system permits the sealing of the trailer substantially air tight for the transcontinental shipment of fresh produce in a controlled preservation atmosphere over mountains without the loss of the preservation atmosphere from inside the trailer.

---

This invention relates to an apparatus for storing, preserving and transporting perishable plant and animal materials such as food products.

It has been proposed to transport perishable materials in a movable container containing the materials and a selected preserving atmosphere so that these materials may be preserved against excessive deterioration during transporting and storage. Examples of atmospheres highly effective for preserving perishable plant and animal materials are described in Bedrosian et al. Patent 3,102,777. A transportation system of this type is disclosed in the copending application of M. A. Fuller et al. Ser. No. 425,397, filed Jan. 14, 1965. These are both assigned to the same assignee as the present application.

One of the features of this invention is to provide a movable container, tightly sealed except the rear access opening for loading and unloading, adapted to contain perishable plant and animal materials such as food materials and a selected preserving atmosphere, with means to maintain a tight seal at this access opening and simultaneously combat the effects of changing internal and external pressure conditions, with this means including a seal member at the access opening yieldable under differential pressure externally and internally and a receiver in the container having means expansible to receive ambient air when internal pressure in the container is less than ambient air pressure and thereby prevent substantial dilution of the preserving atmosphere with ambient air and collapsible when internal container pressure is greater than ambient air to expel air from the receiver rather than expel preserving atmosphere from the container.

Another feature of the invention is to provide such a container including a safety pressure release means for yielding under severe pressure differentials to vent ambient air into the container or vent atmosphere from the container when internal or external pressures exceed a preselected value with this value preferably being that which would cause damage to the container.

Other features and advantages of the invention will be apparent from the following description of an embodiment thereof taken in conjunction with the accompanying drawings. Of the drawings:

FIGURE 1 is a perspective view partially broken away for clarity of illustration showing a loaded semi-trailer embodying the invention.

FIGURE 2 is a vertical sectional view taken along line 2—2 of FIGURE 1 at the front end of the trailer and internally of the front wall thereof.

FIGURE 3 is a transverse sectional view taken through the symmetrical center of a safety pressure release means in the container.

FIGURE 4 is a section taken substantially along line 4—4 of FIGURE 3.

FIGURE 5 is a sectional view taken substantially along line 5—5 of FIGURE 3.

FIGURE 6 is a semi-diagrammatic, fragmentary, perspective view illustrating the transporting of harvested plant and animal materials in containers embodying the invention.

The container 10 illustrated in the accompanying drawings is a semi-trailer adapted to be drawn in the customary manner by a truck 11 or "piggy back" on a train (not shown). The container 10 is adapted to hold perishable plant and animal materials such as food materials here shown as produce packaged in crates 12 within the container 10.

The container or semi-trailer 10 is provided at the rear with the usual access opening 13 that is closed during transit by side hinged doors 14.

The container 10 is charged after loading with a selected preserving atmosphere. This charging may be done through one or more openings 15 at one end of the container such as the front or loading end 16 with the contained air being forced out by the entering preserving atmosphere through one or more openings as illustrated at 17 which, in this instance, is near the rear of the container. Customarily, the preserving atmosphere is forced into the container until the atmosphere exiting from 17 is of the desired composition to indicate that the air has been satisfactorily replaced with preserving atmosphere.

In order to seal the access opening 13 there is provided a flexible seal member 18 which is preferably a disposable plastic sheet such as 6–8 mils polyvinyl held across the access opening 13 in a peripheral frame 19. In FIGURE 1, for clarity of illustration, the flexibe sheet seal member 18 is shown broken away.

During transit of the container 10 and even when used stationary as a storage container for storing the materials under preserving conditions the inerior as well as the exterior of the container 10 is subjected to varying pressure conditions caused by differences in altitude, atmospheric pressure changes and the like. The container 10, which in the illustrated embodiment is a semi-trailer, is subject to leakage if the differential internal and external conditions become too severe. This is true because of the size of the container, the usual materials of construction and because the container as it passes over roads or is otherwise transported is subjected to a certain amount of twisting stress. Also, the mere movement of the container 10, such as the semi-trailer, on its wheels 52 causes air flow over the container from the front or leading end 16 thereof toward and beyond the rear end. This air flow itself tends to cause a certain amount of air leakage.

Before the container, and especially the illustrative semi-trailer, is put into operation it is sealed as tightly as possible using customary sealing procedures. Then, when in operation and the interior and exterior of the container are subjected to differences in pressure differentials, the flexible sheet seal 18 can adapt to minor changes in pressure differentials by yielding either inwardly or outwardly. For this reason the sealing sheet 18 is spaced both from the doors 14 and from the crates 12. As shown in FIGURE 1, the crates 12 are retained against rearward movement by a customary loading bar arrangement (not shown) and latticework support 53 usually constructed of wooden slats.

The sheet 18 which is yieldable can of course accommodate minor changes in pressure differential. Where the changes become severe, however, auxiliary pressure yieldable means are required. In the illustrated embodiment, as shown most clearly in FIGURE 2, this pressure relief means comprises a receiver 20 in the form of a flexible breather bag which is also preferably disposable. This bag may be made of a plastic material such as the above-mentioned polyvinyl. The interior of the bag 20 is connected by a conduit 21 to the exterior of the container 10 with this conduit having a terminal portion 22 with an entrance 23 communicating with the ambient air.

The front 16 or leading end of the container 10 is provided with an inwardly located bulkhead 24 behind which is located the breather bag 20 and over which extends the ambient air conduit 21–22 leading thereto. Also located in front of the bulkhead 24 is a safety pressure release means 25 to be described in detail hereinafter.

The receiver 20 and its connecting conduit performs a very valuable function in preventing dilution of the internal preserving atmosphere with air from outside. Thus, the receiver being an expansible and collapsible breather bag in its preferred embodiment expands to receive ambient air as illustrated in FIGURE 2 when internal pressure on the interior 26 of the container 10 is less than ambient air pressure. When this occurs air instead of being forced through any cracks, nail holes, etc. which are impossible to seal completely is drawn through the conduit 21–22 into the interior of the bag 20 to expand it to the point where internal and external pressure are substantially the same. Then when the pressure differential becomes greater on the interior 26 of the container 10 than is the ambient pressure, the receiver 20 collapses to expel its contained air to the outside through its conduit. If the differential pressure on the interior 26 continues to rise, then some of the preserving atmosphere on this interior will be lost to the ambient air. However, this is not serious because there will still be enough preserving atmosphere left to perform its preserving function. What must be guarded against is drawing in ambient air which would dilute the preserving atmosphere in the interior 26.

The safety pressure release means 25 is provided in the event of failure of the receiver 20 or its conduit means 21–22. In the event of such failure extreme pressure differential could cause damage to the container. The release means 25 is designed to vent internal atmosphere to the exterior when the pressure differential on the interior becomes dangerously high and to vent ambient air into the container when the internal pressure becomes dangerously low. In one embodiment the safety pressure release means 25 becomes operable at pressure exceeding 2.0 inches of water.

As is shown in FIGURES 3, 4 and 5 the safety pressure release means or device 25 comprises a hollow body 27 divided into two internal compartments 28 and 29 by a vertical central wall 30. The bottom of this wall 30 extends into but short of the bottom of a well 31 at the bottom of the device. There is thus provided spaces 32 and 33 on opposite sides of the bottom of the wall 30 for containing a liquid 34. This liquid 34 may be water containing an anti-freeze such as diethyleneglycol.

Located on opposite sides of the well 31 and spaced from opposite sides of the wall 30 are a pair of dams 35 and 36 that extend upwardly above the bottom 37 of the pressure release device 25. Located at one end of each dam 35 and 36 is a narrow slot 38 shown most clearly in FIGURE 4. As is shown in FIGURE 3, the bottom 37 on each side of the central wall 30 slopes toward the well 31.

The compartment 28 communicates with the interior 26 of the container 10 by means of a pipe 39. The compartment 29 of the device 25 communicates by means of a conduit 40 to a connector 41 which serves to join the conduit 40 to the conduit 21 leading from the bag 20 and the terminal conduit 22 (see FIGURE 2). With this arrangement both the compartment 29 and the breather bag receiver 20 communicate with the atmosphere through the same terminal conduit portion 22.

When the differential pressure within the interior 26 of the container becomes too great, such as greater than 2.0 inches of water, atmosphere from the container flows through the conduit 39, into the compartment 28 and through the well 31 to expel liquid therefrom and from there through the conduit 40, connector 41 and terminal conduit 22 to the exterior. As soon as the excessive internal pressure has been relieved in this way the expelled liquid 34 flows by gravity back into the well 31 through its slot 38. In order to prevent the liquid being expelled into the conduit 40 a downwardly extending barrier 42 is provided.

Similarly, when the pressure within the interior 26 of the container becomes excessively low, air is drawn into the compartment 29 through the conduit 40 and forces liquid 34 from the well 31 so that the air can flow into the interior 26 by way of the conduit 39. A similar barrier 42 is provided to prevent liquid being expelled to and through the conduit 39.

As is shown in FIGURE 1, the expansible and collapsible receiver 20 which is here shown as a breather bag may be stored in collapsed condition when it is not in use. In this embodiment the receiver is suspended adjacent the top of the container 10 on the interior thereof by means of spaced eyelets 43 and a tie 44.

As the container 10, such as a semi-trailer, is moved with relation to ambient air the air of course flows over and around the container. For that reason the entrance end 23 leading to the receiver 20 is located at a point on the outer surface of the container where vacuum or pressure conditions caused by this air flow are at a minimum. It has been discovered that this point or area for locating the entrance 23 is preferably on the bottom of the container adjacent the front and still more preferably a front bottom corner.

As noted, the expansible and collapsible container 20 may be stored out of the way when the container is used for ordinary transporting or even when the container is being loaded or unloaded. Although this storage condition in the illustrated embodiment is at the top, it could of course be stored if desired folded against the front 16.

As stored plant and animal materials continue to respirate they give off carbon dioxide. Following customary procedure it is preferred that atmosphere permeable bags of hydrated lime [$Ca(OH)_2$] be positioned in the receiver as indicated at 45 to absorb the excess carbon dioxide given off to prevent imbalance of the selected atmosphere. As many of these bags 45 may be used as required.

Before loading the semi-trailer or other container with the animal or plant material it is made as fluid tight as possible by sealing all of the cracks that can be located and then spraying the inside of the trailer with a customary sealing plastic material. Large cracks, holes and the like are sealed with a putty or caulking compound with or without tape in the customary manner. Because the rear doors 14 take a considerable amount of wear and abuse and therefore cannot be sealed to any practically dependable extent, the flexible seal sheet 18 is provided at the access opening 13 normally closed by these doors.

As a part of the sealing process two rear floor drains 46, one of which is shown in FIGURE 1, are sealed by removable plugs. These plugs are attached by tie lines 47 to the loading bar arrangement so that at the destination when the loading bars are removed the two rear seal plugs are automatically removed from the drains 46. In the preferred construction both of the floor drain plugs 46, the rear sealing sheet 18 and the elongated collapsible breather bag 20 are disposable.

A practical use of the apparatus of this invention is illustrated in FIGURE 6. Here produce from fields 49 is loaded in semi-trailers 10 each pulled by a truck 11.

After loading the interior is sealed by means of the flexible sheet 18 and the rear doors 14 are closed as is customary. The interior 26 of the semi-trailer 10 is then charged with preserving atmosphere in the manner previously described. When the growing and loading areas are in the Pacific coastal states the trailers are transported over the mountains illustrated at 50 and into the valleys and plains beyond. As the trailers are moved up the mountains the differential pressure on the interior 26 becomes progressively greater because of the reduced ambient atmospheric pressure. Because of this increase in internal relative pressure, preserving atmosphere in the interior 26 leaks to the exterior because it is impossible to seal up all of the possible small holes and openings in the semi-trailer.

Then, as the semi-trailer descends from the mountains 50 into the valleys and plains beyond, the relative internal pressure in the space 26 drops to what would be a vacuum condition. However, because of the presence of the receiver or breather bag 20 ambient air is not drawn into the container 10 through small openings therein but is drawn into the receiver 20 through the entrance 23 to expand the receiver. This means that the apparatus of this invention can lose preserving atmosphere to the ambient air but little or no ambient air is drawn into the container to dilute the preserving atmosphere even when the container is subjected to widely varying differential pressures. As shown in FIGURE 2, a convenient location for the receiver 20 is lying on top of the crates 12 where it is free to expand in the space between the crates and the top of the semi-trailer 10.

Having described our invention as related to the embodiment shown in the accompanying drawings, it is our intention that the invention be not limited by any of the details of description, unless otherwise specified, but rather be construed broadly within its spirit and scope as set out in the accompanying claims.

The embodiment of the invention in which an exclusive property or privilege is claimed is defined as follows:

1. Apparatus for storing, preserving and transporting perishable plant and animal materials such as food materials, comprising: a movable container for said materials and a selected preserving atmosphere having an access opening and subjected to changing internal and external pressure conditions, said container being leakable under severe internal-external pressure differential; a receiver in said container; and a conduit to said receiver with an entrance communicating with ambient air, said receiver having means expansible to receive ambient air when internal pressure in said container is less than ambient air pressure and thereby prevent substantial dilution of said atmosphere with said ambient air, and collapsible when said internal pressure in said container is greater than ambient air pressure to expel ambient air from said receiver, said container being subjected to ambient air flow over the container during said movement thereof creating positive or negative pressure conditions of varying intensity adjacent different portions of the exterior of said container, said entrance of said conduit being located at a portion of said exterior where said pressure conditions are at most of minor extent.

2. The apparatus of claim 1 wherein said container has a bottom and a leading end during said movement, and said entrance of said conduit is located in said bottom adjacent said leading end.

3. The apparatus of claim 1 wherein safety pressure release means are provided for yielding under severe internal-external pressure differentials to vent ambient air into said container when said ambient air pressure becomes a first preselected value greater than said internal pressure in said container, and vent said atmosphere from the container when said ambient air pressure becomes a second preselected value less than said internal pressure in said container.

4. The apparatus of claim 3 wherein said safety pressure release means is provided with a second conduit communicating with said conduit to said receiver at an area of said conduit to said receiver between said receiver and said entrance.

5. The apparatus of claim 1 wherein there is provided a seal member at said access opening yieldable under said pressure differential.

References Cited

UNITED STATES PATENTS

| | | | |
|---|---|---|---|
| 541,368 | 6/1895 | Leak et al. | 99—271 |
| 909,527 | 1/1909 | Blackmore | 21—58 X |
| 1,608,224 | 11/1926 | Mauran. | |
| 1,690,072 | 10/1928 | Johnson | 220—85 |
| 3,049,070 | 8/1962 | Hawk | 99—235 |
| 3,209,674 | 10/1965 | Payne | 99—269 X |
| 3,244,326 | 4/1966 | Bull. | |
| 3,269,133 | 8/1966 | Dixon | 99—189 X |

WALTER A. SCHEEL, *Primary Examiner.*

J. M. NEARY, *Assistant Examiner.*